Figure 3:
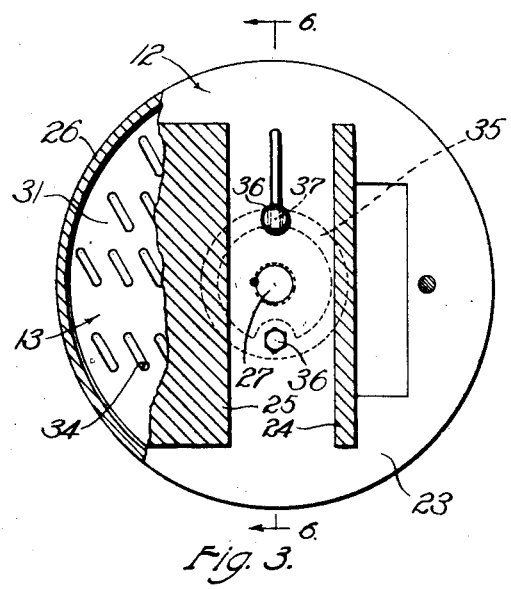

Feb. 21, 1933.   L. F. TONSOR   1,898,469
CAMERA MOUNTING
Filed April 18, 1931   2 Sheets-Sheet 1
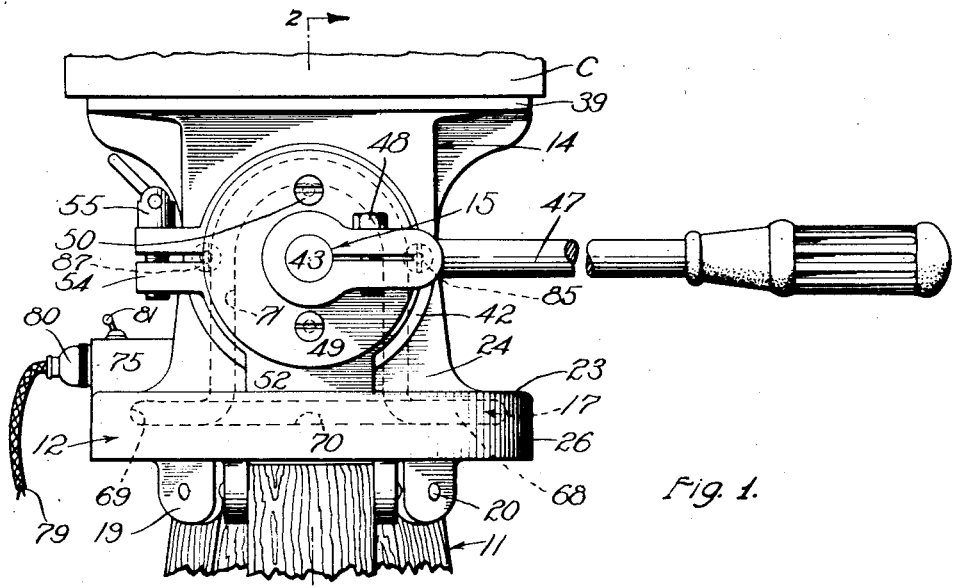
Fig. 1.
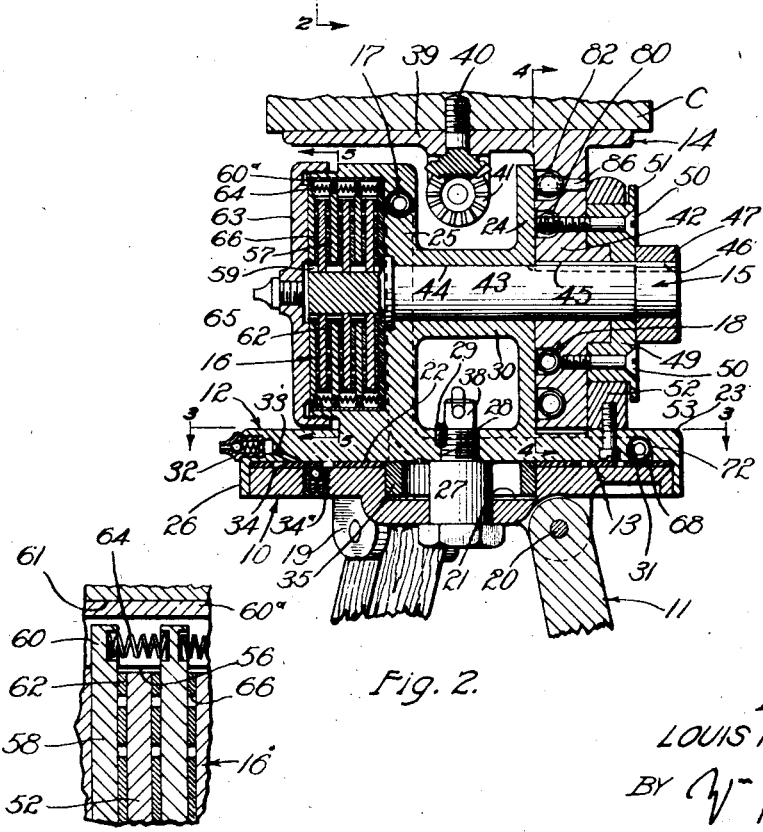
Fig. 2.
Fig. 8.
INVENTOR
LOUIS F. TONSOR
BY
ATTORNEY Feb. 21, 1933.     L. F. TONSOR     1,898,469
CAMERA MOUNTING
Filed April 18, 1931     2 Sheets-Sheet 2

INVENTOR
LOUIS F. TONSOR
ATTORNEY

Patented Feb. 21, 1933

1,898,469

UNITED STATES PATENT OFFICE

LOUIS F. TONSOR, OF LOS ANGELES, CALIFORNIA

CAMERA MOUNTING

Application filed April 18, 1931. Serial No. 531,165.

This invention relates to a camera mounting, and relates more particularly to a mounting head or "free head" for mounting a motion picture camera, or the like, on a tripod or other support.

Several types of mounting devices have been introduced for tiltably and rotatably mounting cameras on tripods. One type of camera mounting provides free pivotal connections about which the tilting and rotary movement occurs, and gearing, usually in the form of worm gearing, is provided to cause the desired movement. In devices of the character referred to, considerable wear takes place in the gearing, so that undesirable looseness and lost motion soon develop. Another type of camera mounting head that has been introduced includes frictional means associated with the pivotal connections for resisting the tilting and rotary motion to normally hold the camera in the desired position and yet permit the camera to be moved as desired. In this last-mentioned form of mounting device, a lubricant, usually in the form of grease, is provided in the frictional holding means to produce dragging and smooth operation. The consistency or viscosity of the lubricant varies with changes in temperature, so that the lubricant becomes thick and tenacious at low temperatures and more fluid at high temperatures. Due to the variations in the consistency of the lubricant at different temperatures, it is extremely difficult to provide for the proper adjustment of the pivotal connections and makes the device extremely hard to operate at low temperatures.

It is a general object of this invention to provide a mounting head for tiltably and rotatably supporting a camera, or the like, that is easy to operate at all times and that does not have undesirable looseness or lost motion.

It is another object of the invention to provide a tiltable and rotatable mounting for a camera that includes an improved friction means for resisting tilting and rotation and for normally holding the camera against movement in any desired position.

It is an important object of the present invention to provide a camera mounting of the character mentioned that includes means for maintaining the working parts of the mounting at a temperature at which they work properly.

It is another object of the invention to provide a camera mounting of the character just mentioned that includes an electric heating element the operation of which may be manually controlled and may be governed by an adjustable thermostat.

It is another object of the invention to provide an improved, effective, and long-wearing friction connection for use in a camera mounting, or the like, for resisting tilting movement of the camera-supporting part of the mechanism.

It is another object of the invention to provide a camera mounting of the character mentioned that includes means for manually adjusting the frictional means for resisting tilting movement of the camera.

A further object of the invention is to provide an effective convenient means for introducing lubricant to the working parts of the head.

It is another object of the invention to provide a mounting for rotatably and tiltably supporting a camera, or the like, having an improved means for counter-balancing or partially taking the load when the camera is in either of the two tilted positions.

Figure 4:
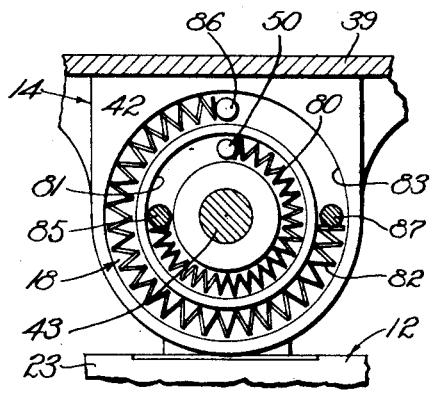
Figure 5:
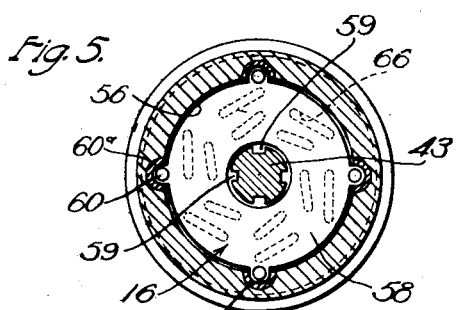
Figure 6:
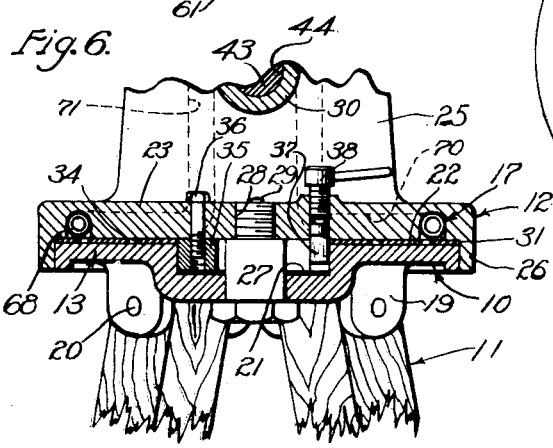
Figure 7:
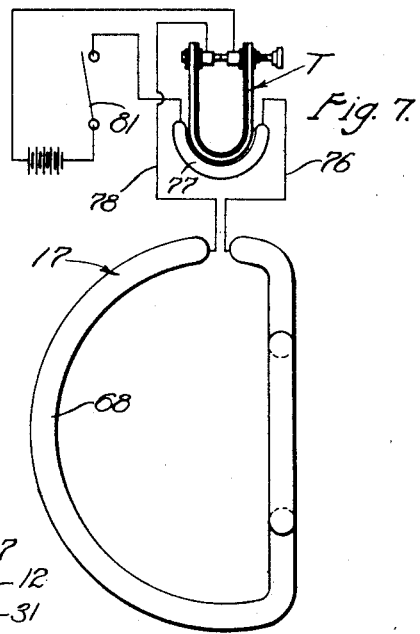

Other objects and features of the invention will be best and more fully understood from the following detailed description of a typical form and application of the invention, throughout which description reference will be had to the accompanying drawings, in which:

Fig. 1 is a side elevation of the mounting head provided by the present invention. Fig. 2 is a vertical detailed sectional view taken substantially as indicated by line 2—2 on Fig. 1. Fig. 3 is a transverse sectional view taken as indicated by line 3—3 on Fig. 2, with a portion of the device broken away to show a friction disc in elevation. Fig. 4 is a view of the counter-balancing means provided by the present invention, being a view taken substantially as indicated by line 4—4 on Fig. 2, illustrating the inner side of the support. Fig. 5 is a vertical detailed sectional view taken substantially as indicated by line 5—5 on Fig. 2. Fig. 6 is a vertical detailed sectional view taken substantially as indicated by line 6—6 on Fig. 3. Fig. 7 is a wiring diagram of the heating element and controls therefor, and Fig. 8 is an enlarged vertical detailed sectional view of a portion of the improved frictional means provided by this invention.

The camera mounting provided by this invention includes, generally, a head 10 mounted on or constituting a part of a tripod 11, a body or base 12 supported on the head 10 for rotation about a vertical axis, frictional means 13 for resisting rotation of the body 12, a top or head 14 for supporting a camera C, or the like, means 15 mounting the head 14 on the body for turning or tilting about a horizontal axis, frictional means 16 in connection with the tiltable connection 15 for resisting tilting of the head 14, a heating element or heating means 17 for the working parts, means 18 for counter-balancing the head 14 and camera C when in tilted positions, and various other parts, the details and functions of which will be hereinafter described.

The head 10 may constitute a portion of the tripod 11, or may be designed for attachment to the supporting heads of various types of tripods. In the particular embodiment of the invention illustrated in the drawings, the head 10 constitutes the upper part or head of the typical tripod 11. It is to be understood that the invention is not to be considered as restricted or limited to the particular formation of the head 10 or to its mounting on the tripod 11. The head 10 is a circular member and is normally horizontally disposed. Spaced lugs 19 are provided on the lower side of the head 10 and carry pivot pins 20 for pivotally connecting the legs of the tripod 11 with the head. A central socket 21 is provided in the upper side of the base, and an annular bearing surface 22 is provided on the upper side of the head to rotatably support the body 12.

The base or body 12 is rotatably mounted on the tripod head 10 and is provided to tiltably support the camera-supporting head 14. The body 12 is provided with a circular lower base flange 23 and spaced upwardly-projecting brackets 24 and 25. The circular base flange 23 is rotatably supported on the upper end or bearing face 22 of the head 10 and is provided at its periphery with a downwardly-projecting annular flange 26 overhanging the periphery of the base 10. A pin or screw 27 extends through central openings in the base 10 and flanges 23 to hold the body 12 against displacement from the head. The bolt 27 is provided at its lower end with an enlargement and its upper end is screw threaded into an opening 28 in the base flange 23. The pin or bolt 27 may be locked in position by a suitable set screw 29. The brackets 24 and 25 are spaced at opposite sides of the vertical center of the device and are preferably integral with the flange 23. The brackets 24 and 25 are vertical and parallel and may be connected by a central web 30.

The frictional means 13 is provided to resist rotation of the body 12 relative to the base 10 and is such that it normally holds the body 12 and parts associated therewith against turning and yet permits deliberate operation or rotation of the body. The means 13 includes an annular body 31 of fibrous or movement-resisting material interposed between the bearing face 22 of the base and the lower side of the flange 23. The weight of the body 12, the head 14, and the camera C may be such as to provide for the necessary friction between the flange 23 and the base 10. However, the screw 27 may be employed to normally exert compression on the friction disc 22 to resist rotation of the body 12 as desired.

Means is provided for lubricating the frictional means 13. A suitable grease gun or lubricant fitting 32 may be provided in an opening or port 33 in the flange 23. The port 33 communicates with the space between the bearing face 22 of the flange 23, and a plurality of elongated openings or slots 34 are provided in the friction disc 31 to hold the lubricant. The fitting 32 is in the nature of a check valve fitting to permit the discharge of lubricant into the port 33 under pressure and to prevent the outward discharge of the lubricant. The invention provides means for releasing or discharging excessive lubricant or grease from the space between the bearing face 22 and the flange 23. A valved fitting 34$^a$ is provided in an opening in the base 10 to permit the discharge of fluid upon the fluid pressure in the frictional connection 13 becoming excessive. The fitting 34 may include a spring-pressed ball arranged to permit the discharge of the lubricant upon a predetermined excessive pressure occurring in the frictional joint 13.

In accordance with the standard or common practice, means may be provided for positively locking the body 12 against rotation on the base 10. A split expansible sleeve 35 is arranged in the socket 21 and is connected with the flange 23 by a pin 36, or the like. The means for expanding the sleeve 35 includes a tapered plug or wedge 37 adapted to be forced between the ends of the split sleeve. A screw 38 is threaded into a vertical opening in the flange 23 and is operable to force the wedge 37 between the ends of the sleeve 35 to expand the sleeve into gripping or holding engagement with the walls of the socket 21.

The top or head 14 is provided to directly carry the camera C and is tiltably connected to the body 12 by the means 15. The head 14 includes a normally horizontal upper portion 39 for carrying the camera C. A screw 40 may extend through a central opening in the portion 39 to thread into an opening in the case of the camera C to attach the camera to the head. The screw 40 may be operable by a beveled gear 41. The head 14 is provided with one or more brackets or supports projecting downwardly from its upper portion 39 to pivotally connect with the body 12. In the particular embodiment of the invention illustrated in the drawings, there is one bracket or support 42 projecting downwardly from the upper portion 39 at a point offset from or spaced from the vertical central axis of the device. It is to be understood that the head 14 may be provided with two or more supports 42 to be tiltably connected with the base 12 by the means 15. The support 42 may have vertical inner and outer sides and its inner side may slidably engage the outer side of the bracket 24. The lower end of the support 32 is preferably rounded, as illustrated throughout the drawings.

The means 14 for pivotally or tiltably mounting the head 14 on the base 12 includes a shaft 43 extending through an opening 44 in the brackets 24 and 25 and passing through a central opening 45 in the support 42. The support 42 may be connected with the shaft by a key 46. The shaft 43 is freely rotatable in the opening 44 and the opening 44 passes through the web 30 so that the central portion of the shaft is fully housed in the opening. The shaft 43 projects outwardly beyond the outer side of the support 42 and an operating handle or lever 47 is mounted on its projecting end. The lever or handle 47 is provided to facilitate rotation of the body 12 and tilting of the head 14. The handle 47 may be of any suitable length and may be connected to the shaft 43 by the key 46. The inner end portion of the handle 47 may be split and connected to the shaft by a screw 48 clamping its split ends onto the projecting end of the shaft.

The invention includes means for locking the head 14 against movement. The locking or positive holding means for the head 14 may include a collar 49 attached to the outer side of the support 24 by screws 50. The periphery of the collar 49 is in the nature of a channel and an outwardly projecting flange 51 is provided at the outer edge of the collar. A split clamping or locking sleeve 52 surrounds the collar 49 and is attached to the flange 23 by a screw 53. The locking sleeve 52 is provided at its ends with projecting arms 54 carrying a screw 55 for clamping the sleeve onto the collar 49 and for releasing the sleeve. Under normal conditions the split sleeve 52 may be free of the collar 49, but may be operated by the screw 55 to clamp onto the collar 49 and hold the head 14 against movement.

The friction means 16 is provided to resist tilting movement of the head 14 and to normally hold the head 14 against tilting movement until deliberately operated or shifted. The means 16 is associated with the tiltable mounting means 15 so that the means 15 and 16 form a frictional joint or connection between the body 12 and the tiltable head 14. In the preferred construction, a circular socket 56 is provided in the outer side of a support 25 to house or carry the friction means 16. The friction means 16 includes a plurality of spaced friction discs 57 arranged within the socket 56 and rotatable with the shaft 15 and a plurality of friction discs 58 interposed between the several discs 57 and held against rotational or turning movement. The shaft 43 projects into the socket 56 and the discs 57 are connected to the shaft to rotate therewith by sliding key or spline connections 59.

The male or stationary friction discs 58 are spaced between each of the several movable discs 57 and are slidably carried in the socket 56. A plurality of spaced outwardly-projecting lugs 60 are provided on each disc 58 to slidably fit bearings or slide bushings 60ª in longitudinal internal grooves 61 in the socket 56. The lugs 60 slidably cooperate with the bushings 60ª to hold the friction discs 58 against rotation or turning. The bushings 60ª are preferably of stainless steel so that they cannot become corroded by acids, etc., in the lubricant provided for the friction means. Discs 62 of fibrous or suitable movement-resisting material are interposed between each of the several discs 57 and 58.

The assembly of the several discs 57 and 58 and 62 is slidable or movable longitudinally relative to the shaft 43, and the present invention provides means for manually adjusting or varying the cooperative frictional pressure between the discs. A cap 63 is screw-threaded onto the outer side of the support 25 to close the outer end of the socket 56 and to exert a compression strain on the discs of the friction means 16. The periphery of the cap 63 may be suitably knurled or roughened so as to be readily gripped. It will be apparent how the cap 63 may be threaded or adjusted to vary the resistive action of the friction plates of the means 16.

It is a feature of the present invention that means is provided for normally urging the male discs 58 apart or away from one another and to aid in releasing or loosening the friction discs of the means 16 upon the cap 63 being threaded outward. Helical compression springs 64 are arranged between the lugs 60 of the several friction discs 58. The springs 64 may be normally under compression so as to exert pressure to move the several discs 57 and 58 outward upon outward adjustment or loosening of the cap 63. Means is provided for supplying a lubricant to the socket 56 to lubricate the friction discs. A suitable alemite or lubricant fitting 65 may be screw threaded into an opening in the cap 63 to discharge into the socket 56. Spaced openings or slots 66 may be provided in the discs 62 of movement-resisting material to hold or carry the lubricant.

The heating means 17 is provided to heat the means 13 and 16 and parts adjacent thereto so that the lubricant contained in or associated with the means 13 and 16 may have the desired fluidity to provide for the easy and smooth operation of the mechanism. The means 17 is in the nature of an electrical heating means and includes a heating element 68 arranged in an opening 69 in the body 12. The opening 69 includes a substantially semi-circular portion 70 extending through the body flange 23. The curved lower portion 70 of the opening is preferably curved about the vertical axis of the body 12 and is preferably arranged adjacent the lower side of the flange 22. The opposite ends of the lower opening portion 70 communicates with or joins the opposite ends of an upper portion 71 of the opening which passes through the support 25. The portion 70 of the opening passes upwardly through the support 25 from one end of the portion 70 and extends around the shaft opening 44 and then passes downwardly to join the opposite end of the lower portion 70. The upper portion 71 of the opening 69 passes upwardly at opposite sides of the shaft opening 44 and its upper end is preferably curved concentrically about the axis of the opening 44. The upper portion 71 of the opening 69 is preferably adjacent the base or inner end of the socket 56.

The heating element 68 extends completely through the opening 69 so as to be operable to warm or heat the several parts of the friction means 13 and the friction means 16. In the particular form of the invention illustrated in the drawings, the heating element 68 is in the nature of a non-inductive coil having the necessary resistance. The element or heating coil 68 may be encased in a tube 72 of insulating material.

In the preferred embodiment of the invention, thermostatic means is provided for controlling the operation of the heating element 68. It is preferred to provide an adjustable thermostat for controlling the heating element 68. The thermostat T may be of any suitable or convenient type of adjustable thermostatic switch or control and may be housed in an enlargement or boss 75 on the flange 23. A lead or conductor 76 may connect one end of the heating coil 68 with an end of a secondary heating element 77 of the thermostat, while a lead or conductor 78 may connect the opposite end of the heating element 68 with a terminal of the thermostat. It is to be understood that a thermostat may be employed in which working or contact parts may be controlled by the temperature of the parts of the body 12 in which case the conductor 76 may directly connect with a terminal of the thermostat. The electrical energy may be supplied to the thermostat T and heating element in any suitable manner, for example, through a flexible cord or multiple conductor 79 provided with a plug 80 to releasably plug into the outer end of the boss 75 of the thermostat. In the preferred form of the invention, a manually-operable switch 81 is provided to control the operation of the heating element 68.

It will be apparent how the thermostat T may be adjusted to provide for the desired operation of the heating element 68 so that the frictional movement-resisting means 13 and 16 may be heated to operate in an effective manner at normal temperatures or at low temperatures. The heat provided by the heating element 68 is absorbed by the flange 23 and support 25 and by the frictional disc 31 and the several frictional discs of the means 16 to warm the lubricant provided in the means 13 and 16. It will be apparent how the heating element 68 may be controlled as desired and how the plug 80 and conductor 79 may be removed or released from the device when desired.

The means 18 is provided to counter-balance or partially take the load of the head 14 and camera C when the head 14 is in a tilted position. The means 18 is in the nature of a spring means and includes a spring 80 arranged in an annular groove 81 in the inner side of the support 42 and a spring 82 arranged in an annular groove 83 in the inner side of the support 42. In accordance with the invention the grooves 81 and 83 are arranged one within the other so that the springs 80 and 82 are spaced apart and arranged one within the other. The annular grooves 81 and 83 are concentrically curved about the longitudinal axis of the shaft 43. The inner side of the support 42 is in sliding engagement with the outer side of the bracket 24 so that the springs 80 and 82 are held against displacement from the grooves. One end of the spring 80 is in engagement with a screw 50 carried by the support 42, while the opposite end of the spring 80 is in engagement with a pin or screw 85 carried by the bracket 24. One end of the outermost spring 82 is engaged by a pin 86 carried by the support 42, while the opposite end of the spring 82 is engaged by a screw 87 carried by the bracket 24. In accordance with the broader aspects of the invention, the springs 80 and 82 may be either compression or tension springs. In the present instance, the springs 80 and 82 may be considered as being compression springs, and it will be apparent how a spring will operate to counter-balance or partially support the load when the head 14 is tilted in either direction.

It is believed that the utility and practicability of the camera mounting provided by the present invention will be readily apparent from the foregoing detailed description. The frictional means 13 may be such that the weight of the body 12, the head 14, and the camera C is sufficient to provide for the necessary resistance to rotation of the body on the tripod head 10. However, if desired, the bolt 27 may be employed to adjust the frictional connection 13. Lubricant may be supplied to the means 13 in the desired quantity through the fitting 32; and, in the event that excessive lubricant is provided between the flange 23 and the head 10, the outlet valve 34 will operate to discharge the excessive lubricant. The improved frictional means 16 is such that it may be adjusted to normally resist tilting of the head 14 in the desired manner. The means 16 is provided to normally hold the head 14 against tilting and to permit deliberate shifting or tilting of the head when necessary. The cap 63 provides a means for adjusting the friction means 16 as found desirable. The springs 64 operate to loosen or release the several friction discs upon outward threading of the cap 63 so that the means 16 cannot jam or become inoperative. The lubricant fitting 65 provides a means whereby the frictional means 16 may be lubricated as desired.

The heating means 17 forms an important part of the invention and ensures the proper, easy, and smooth operation of the device under any temperature conditions. If desired, the thermostat T may be adjusted so that the heating element or coil 68 may operate whenever the temperature drops sufficiently low. It will be apparent that the thermostat may be set to maintain the working parts of the mounting at a substantially constant temperature. However, it may be found practical to only employ the heating means 17 at comparatively low temperatures where the lubricant in the means 13 and 16 might become heavy and tenacious. The heating element 68 operates to heat or warm the various parts of the body 12 so that the lubricant in the means 13 and 16 may be maintained in the desired condition or at the desired consistency when the atmosphere is at low temperatures. The counter-balancing means 18 operates to aid the friction means 16 and to aid in supporting the head 14 when in a tilted position so that the head is comparatively easy to return to a horizontal position from an excessively tilted position. It is to be noted that the invention provides a very simple camera mounting that is smooth and effective in its operation and that does not have any looseness or lost motion.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A camera mounting of the character described including, a body, a head, a pivotal connection between the body and head, means for lubricating the pivotal connection, and means for heating the parts of the connection to make the lubricant the desired consistency.

2. A camera mounting of the character described including, a body, a head, a pivotal connection between the body and head, friction means associated with the pivotal connection, means for maintaining a lubricant in the friction means and means for heating the parts of the said friction means to make the lubricant the desired consistency.

3. A mounting of the character described including, a base, a body, a pivotal connection between the base and body, means for lubricating the connection, a head, a pivotal connection between the body and head, means for lubricating the last mentioned connection and means for heating the parts of the said connections to maintain the lubricant in the desired condition.

4. A camera mounting device of the character described including two parts, one a body, the other a head for carrying a camera, a bracket on one of the parts, a support on the other part, a shaft extending through openings in the bracket and support to pivotally connect the head with the body, frictional means associated with the shaft and disposed in an opening in the bracket and operable to resist pivotal movement of the head, means for lubricating the frictional means, and means carried by the bracket to heat the parts of the frictional means to make the lubricant of the desired consistency.

5. A camera mounting including a base, a body, a rotatable connection between the base and body, frictional means associated with the rotatable connection for resisting rotation of the body relative to the base, means for lubricating the frictional means, a head for carrying a camera, a tiltable connection between the head and body, frictional means for resisting tilting of the head, means for lubricating the last mentioned frictional means, and means for heating the parts of the said frictional means to make the lubricant the desired consistency.

6. A camera mounting including, a body, a head, a tilting connection between the body and head including a shaft, and friction means for resisting tilting of the head including spaced plates carried by the shaft, plates held against rotation with and movable longitudinally of the shaft, the last-mentioned plates being interposed between the first-mentioned plates, and spring means between the last-mentioned plates.

7. A camera mounting including, a body having a socket, a head, a tilting connection between the body and head including a shaft passing through openings in the body and head and extending into the socket, and friction means for resisting tilting of the head including spaced plates in the socket slidable on and rotatable with the shaft, plates interposed between the first-mentioned plates held against rotation with and slidable longitudinally of the shaft, springs between the last-mentioned plates, and means for maintaining a compression strain on the assembly of the plates, said means including a screw-threaded cap closing the outer end of the socket.

8. A camera mounting including a body, a head, a pivotal connection between the body and head including a bracket on the body, a support on the head, and a shaft passing through openings in the bracket and support, and means for counter-balancing the head when in a tilted position, including a spring in a groove in the support concentric with the shaft, a pin carried by the bracket engaging one end of the spring, and a pin carried by the support engaging the other end of the spring.

9. A camera mounting including, a body, a head, a pivotal connection between the body and head including a bracket on the body, a support on the head, and a shaft passing through openings in the bracket and support, and means for counter-balancing the head when in a tilted position including springs arranged in grooves in the support, the grooves being one within the other and being concentric with the shaft, and means on the bracket and support for engaging the opposite ends of the springs.

10. In a camera mounting having movable parts, means for lubricating the movable parts, a heating system comprising means for heating the said movable parts to render the lubricant more fluid, and means to regulate said heating system to govern the temperature of said movable parts.

In witness that I claim the foregoing I have hereunto subscribed my name this 7th day of April 1931.

LOUIS F. TONSOR.